Aug. 29, 1967   R. P. SMITH   3,338,003
EXPANDING TRAILER WITH PIVOTABLE RIDGE POLE AND FURNITURE
Filed Oct. 29, 1964   6 Sheets-Sheet 1
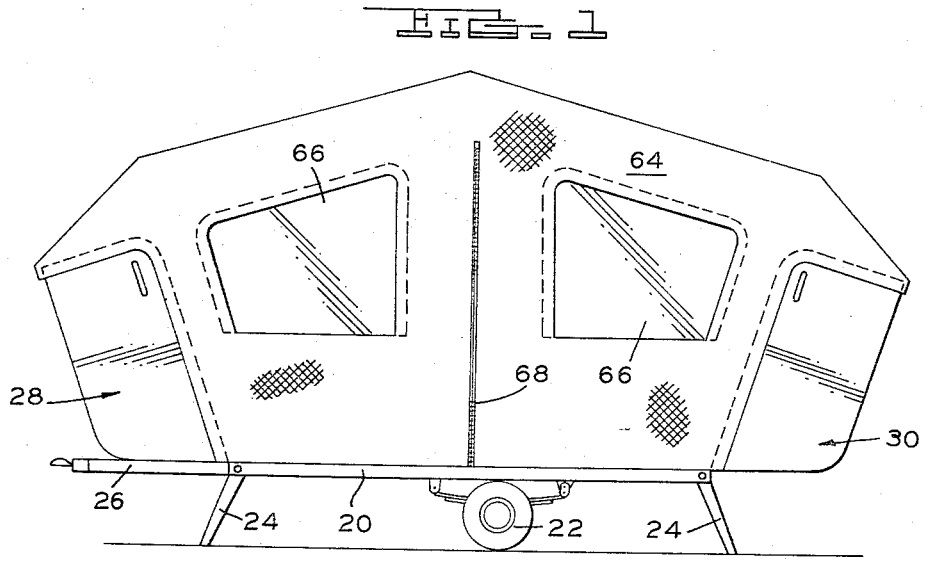
FIG. 1
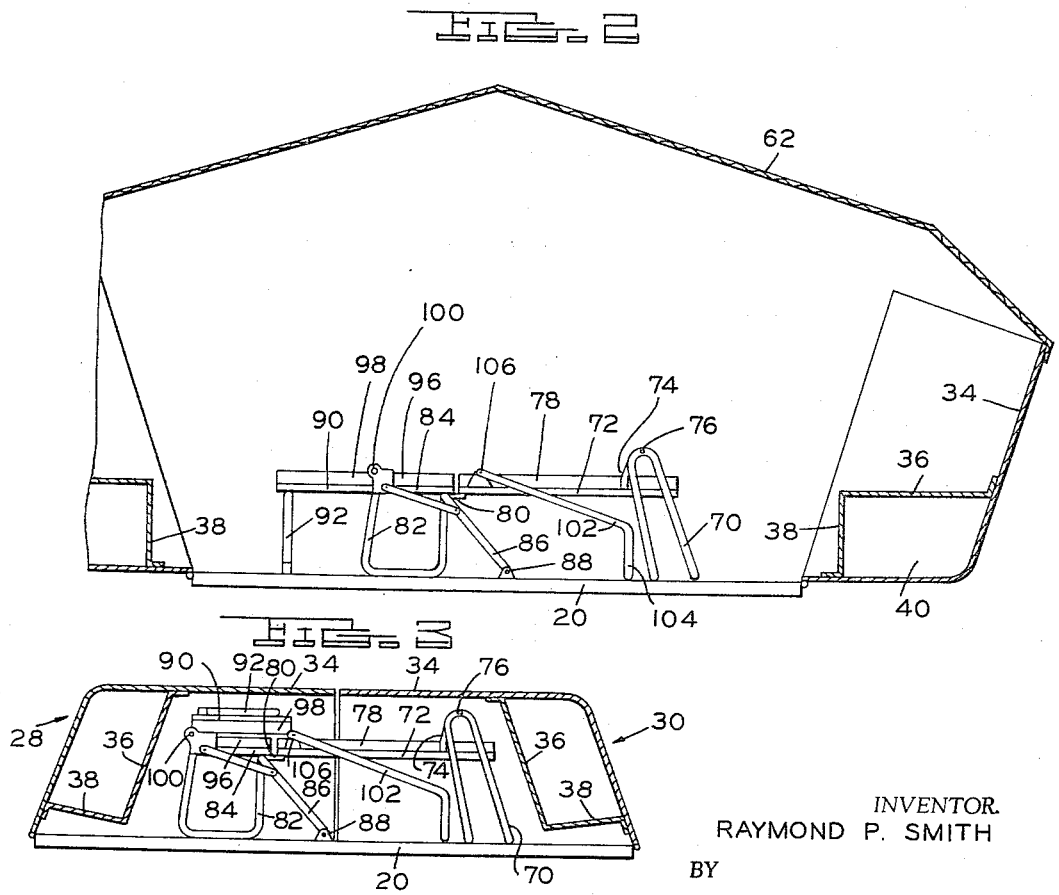
FIG. 2
FIG. 3
INVENTOR.
RAYMOND P. SMITH
BY
Barnes, Kisselle, Raisch & Choate
ATTORNEYS

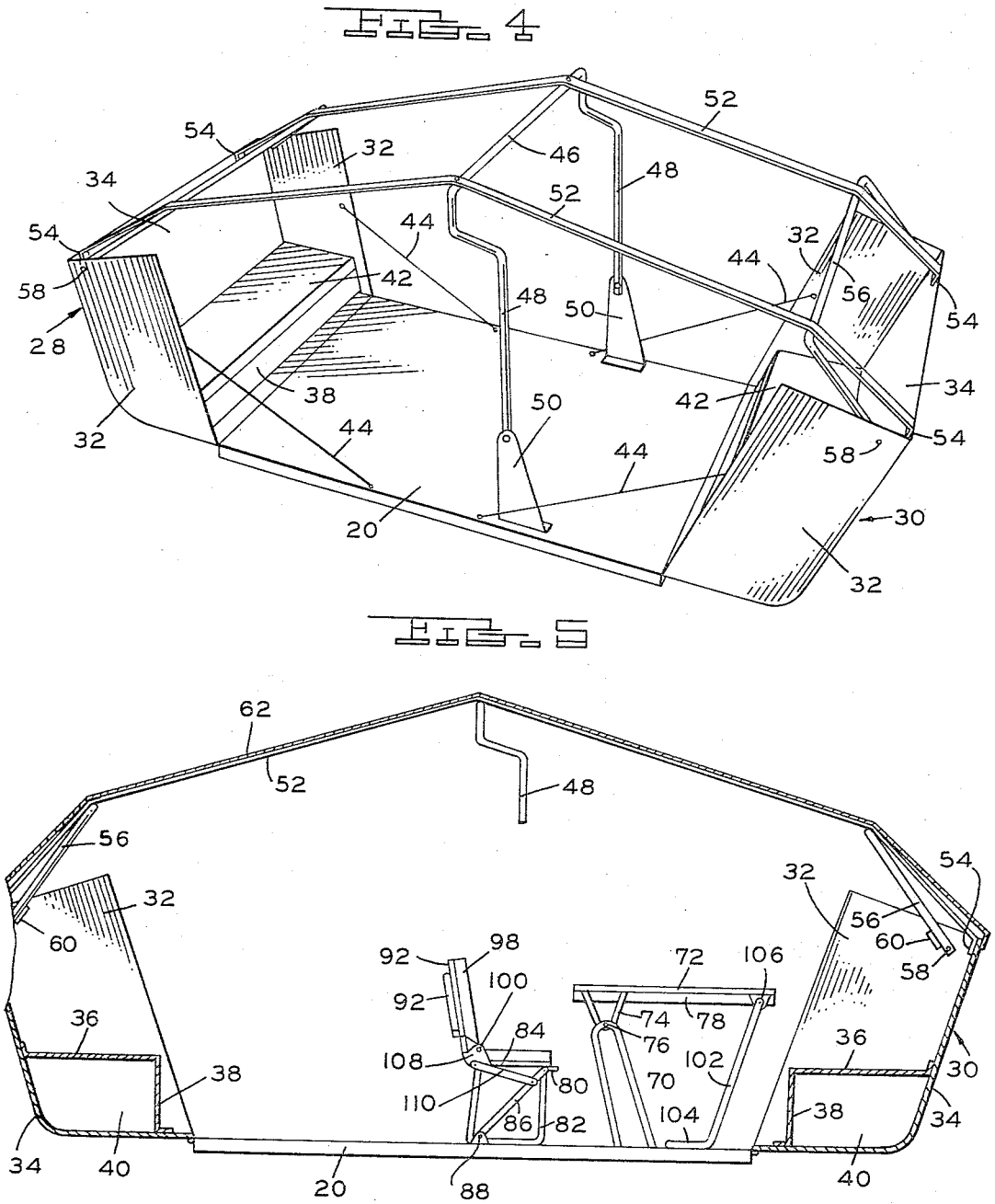

Aug. 29, 1967  R. P. SMITH  3,338,003
EXPANDING TRAILER WITH PIVOTABLE RIDGE POLE AND FURNITURE
Filed Oct. 29, 1964  6 Sheets-Sheet 3
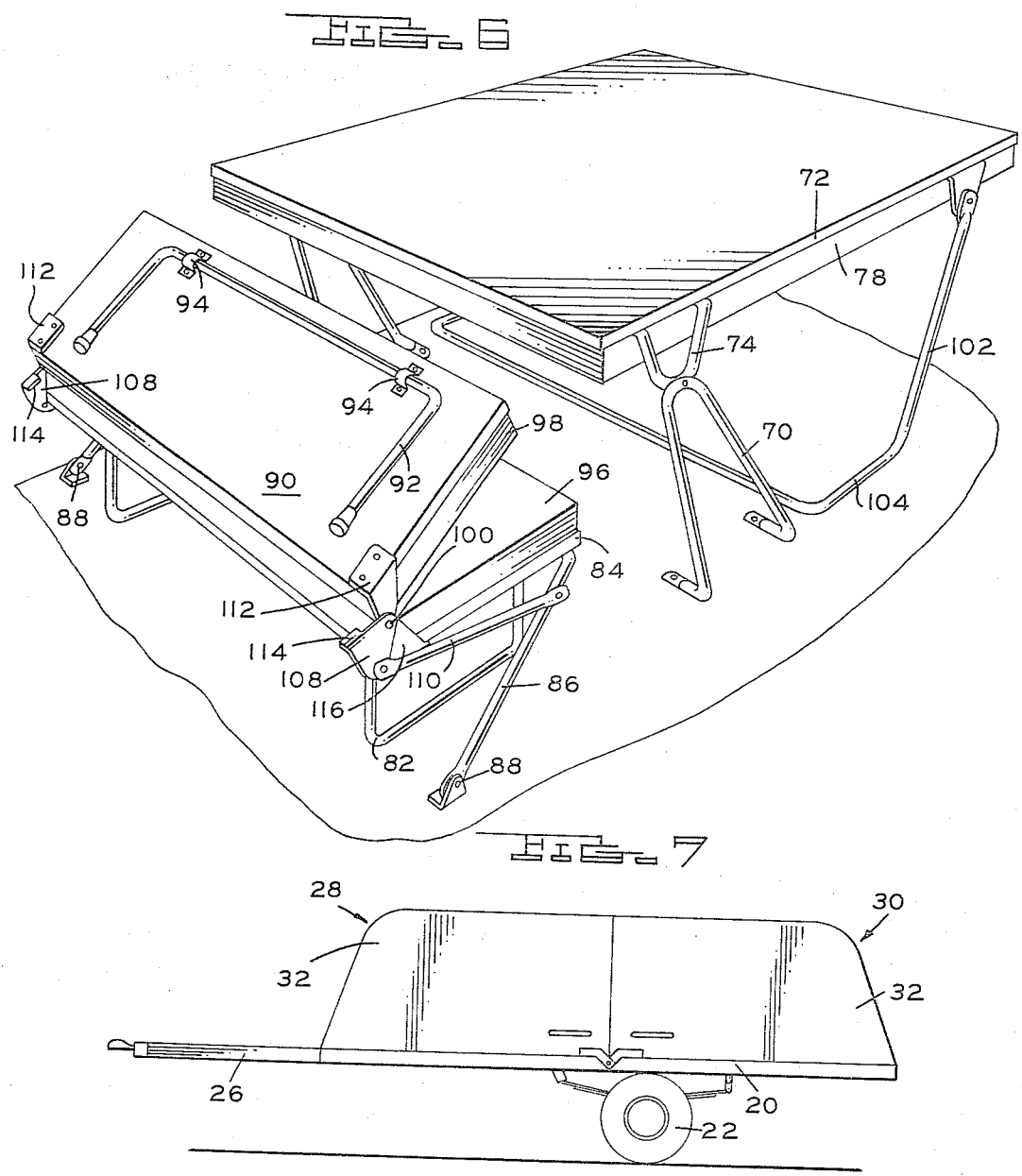
INVENTOR.
RAYMOND P. SMITH
BY
Barnes, Kisselle, Raisch & Choate
ATTORNEYS Aug. 29, 1967 R. P. SMITH 3,338,003
EXPANDING TRAILER WITH PIVOTABLE RIDGE POLE AND FURNITURE
Filed Oct. 29, 1964 6 Sheets-Sheet 4
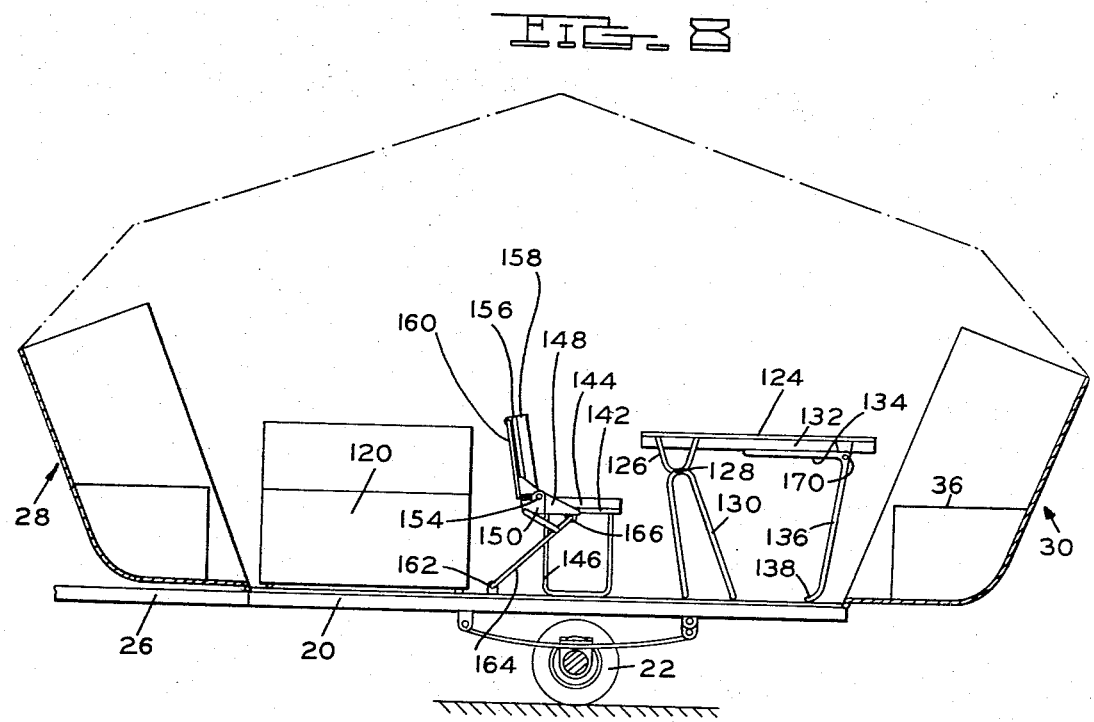
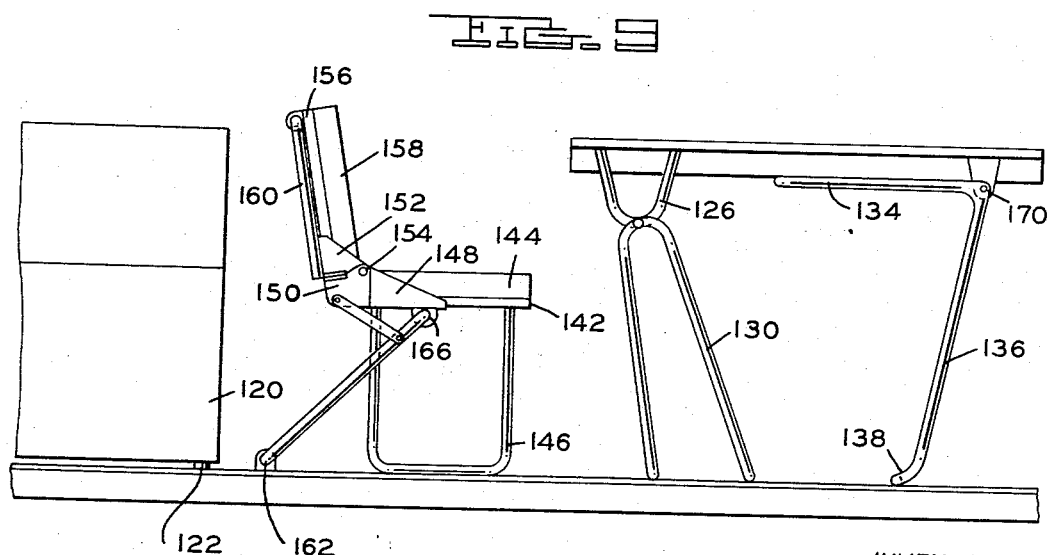
INVENTOR
RAYMOND P. SMITH
BY
Barnes, Kisselle, Raisch & Choate
ATTORNEYS

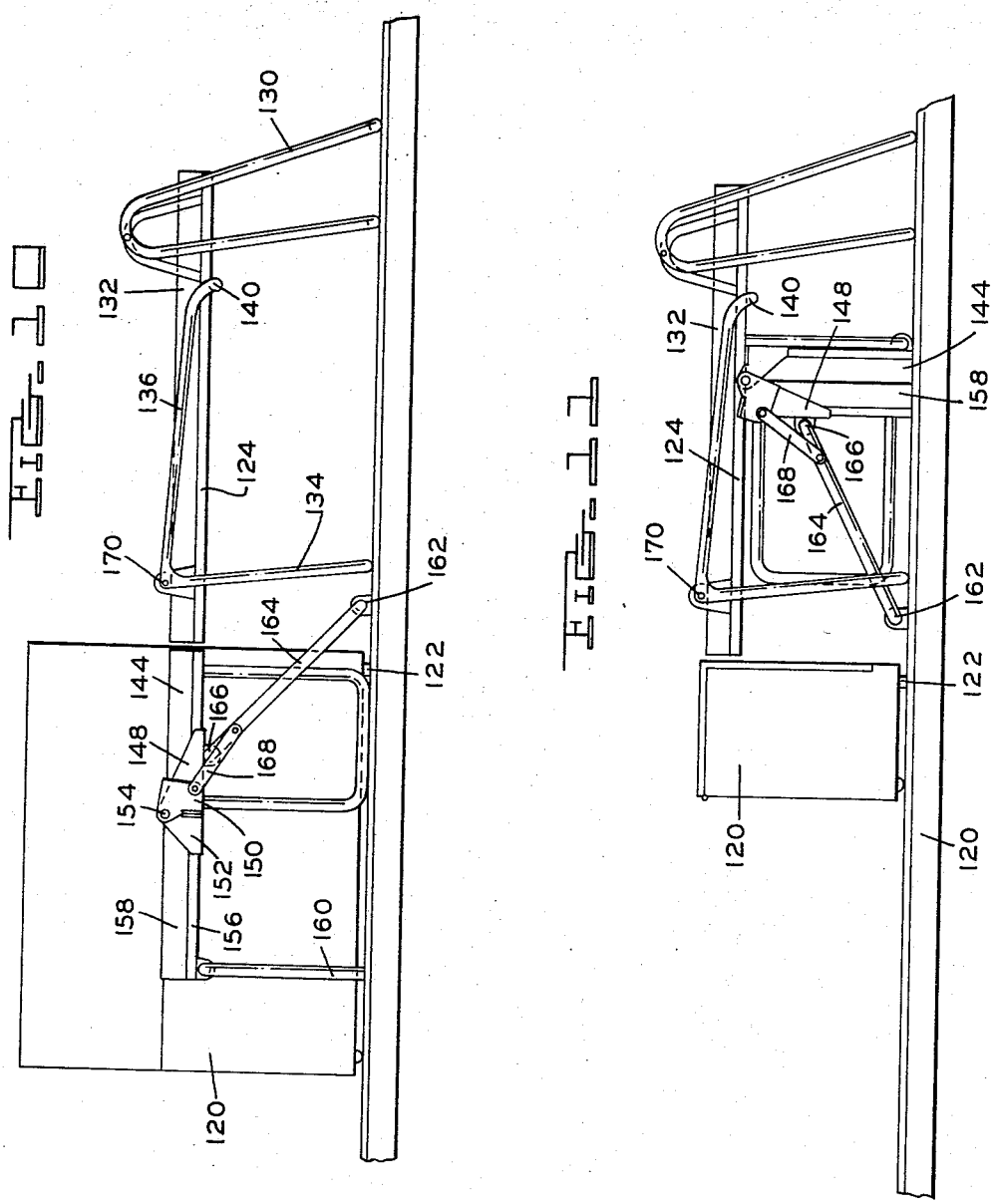

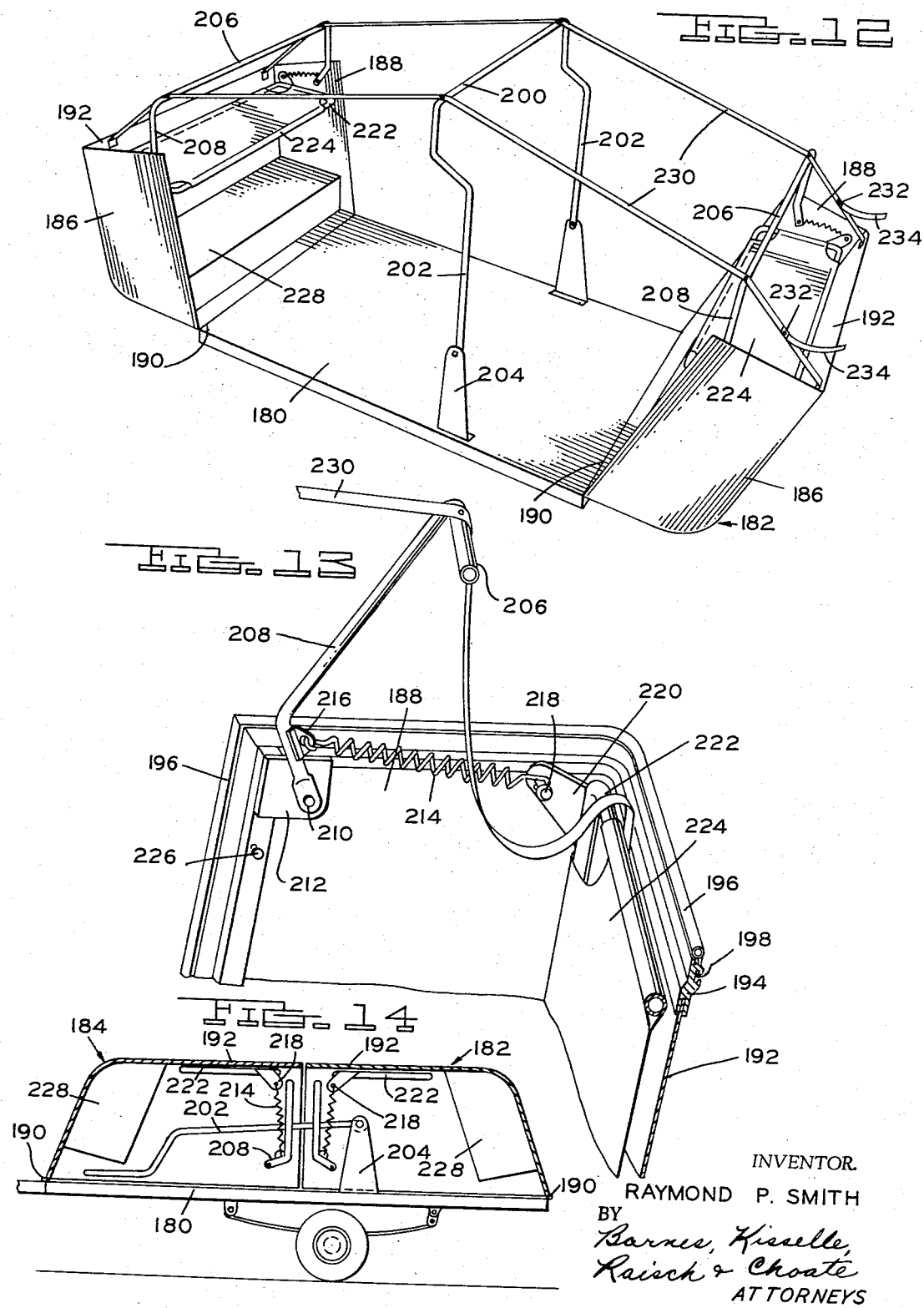

United States Patent Office 3,338,003
Patented Aug. 29, 1967

3,338,003
EXPANDING TRAILER WITH PIVOTABLE
RIDGE POLE AND FURNITURE
Raymond P. Smith, 10825 La Salle, Huntington
Woods, Mich. 48070
Filed Oct. 29, 1964, Ser. No. 407,467
15 Claims. (Cl. 52—29)

ABSTRACT OF THE DISCLOSURE

This invention relates to a folding structure for vehicles such as camping trailers wherein the protective housing for the closed assembly furnishes part of the housing of the open assembly, and the supporting means for the flexible canvas covering the living quarters is so arranged that it does not interfere with the central floor space of the unit, thus permitting a furniture assembly in the form of a table and bench to be converted into a full-size bed with a supporting mechanism which accomplishes the translation of the various portions of these furniture pieces to different positions for different functions.

---

This invention relates to an expanding trailer for camping purposes.

It is an object of the invention to provide an improved trailer construction, both with respect to trailer design and interior furnishings. Reference is made to my U.S. Patent No. 3,062,579, which issued Nov. 6, 1962, wherein the general type of construction is illustrated.

It is an object of the present invention to provide a structure which is cheaper to manufacture and easier to operate and a construction which is also lighter in overall weight.

It is a further object of the invention to provide an improved interior furniture arrangement which cooperates with the trailer construction to provide a compact folded arrangement when the device is collapsed for road-running purposes and to permit better location on the trailer floor while still permitting central location for storage.

It is an object to provide a trailer with a low overall folded height so that it may be pulled by modern cars of the compact variety as well as others without interfering materially with rear view vision.

It is a further object to provide a trailer construction with a furniture arrangement which provides a bed and table construction so positioned that it provides as much space as possible on one side of the arrangement particularly in the table position and permits storage space for a utility such as a stove or refrigerator cabinet in the folded position.

Another object of the invention is the provision of a novel linkage mounting for the furniture construction so that it may be moved to its various positions conveniently and easily, and certain parts will be locked in a functional position depending on the location on the floor.

Other objects and features of the invention relating to details of construction and operation will be apparent in the following description and claims.

Drawings accompany the disclosure and the various views thereof may be briefly described as:

FIGURE 1, a view of the trailer in open position.

FIGURE 2, a view of the trailer in open position showing the bed construction.

FIGURE 3, a view of the trailer in collapsed position showing the furniture storage.

FIGURE 4, a view of the trailer frame unit with the flexible covering removed.

FIGURE 5, a view of the furniture in table and bench position.

FIGURE 6, an enlarged perspective view of the table and bench position.

FIGURE 7, a view of the collapsed trailer.

FIGURE 8, a view of a modified furniture construction in the table and bench position.

FIGURE 9, an enlarged view of the furniture articles of FIGURE 8.

FIGURE 10, a view of the furniture articles of the modified construction in the bed position.

FIGURE 11, a view of the modified furniture construction in collapsed position.

FIGURE 12, a view of a modified frame structure.

FIGURE 13, an enlarged view of a corner of the modified structure illustrating details of the parts.

FIGURE 14, a sectional view of the trailer folded to show the relationship of the parts.

Referring to the drawings:

In FIGURE 1, the trailer is shown with a floor panel 20 having suitable road wheels 22, the undercarriage being of standard construction and not shown. Stabilizing legs 24 are suitably mounted so that they may be lowered when the trailer is in stationary position. A draw bar construction 26 is provided for a suitable trailer hitch.

On each end of the floor panel 20 are fore and aft hinged boxes 28 and 30, each box having end walls 32 which form the sides of the trailer and each box having a top wall 34 which forms the covering for the trailer in collapsed position and forms the ends of the trailer in open position. Suitable joints are provided for the engaging parts in the folded position to shield the interior of the folded trailer and the end boxes are suitably hinged to the floor panel 20 so that they may pivot from the position shown in FIGURE 7 to the position shown in FIGURES 1 and 4.

Each of the end boxes is provided with a bench having a horizontal supporting panel 36 and a front support panel 38 to form benches at either end of the trailer in the open position. These benches can also form storage compartments 40 which can be made accessible from the interior and also in some instances from the exterior by providing a door in a proper place. In the completed structure, a cushion 42 is fastened on to the panels 36. It is preferable to provide limit cables 44 which are anchored at one end to the wall 32 and at the other end to the floor 20 to support the end boxes 28 and 30 in the open position.

A support for the roof structure of the trailer is created by a U-shaped stanchion which forms a ridge bar 46 with two side legs 48 hinged on stationary vertical bracket members 50 which are solidly anchored to the floor 20. Side legs 48 are offset in dog-leg fashion to permit a center door opening in the covering structure to be described. Parallel straps 52 on each side of the ridge bar are supported thereby and have their ends anchored at 54 on the top edge of panel 34 of the end boxes as viewed in FIGURE 4. These straps are held up near the ends of the device by a U-bar 56 pivoted at each end at 58 and held in place by a suitable, removable block 60 (FIGURE 5). The canvas or plastic covering overlying the entire top portion has a top panel 62 which extends down to overlap the top edges of the panels 34 being suitably fastened thereto in removable engagement. This top has side panels 64 which may have windows 66, one side being provided with a zipper door opening 68 (FIGURE 1). The straps 52 are anchored to the ridge pole 46 so that the ridge pole will be raised by the straps as the ends 30 and 32 are opened outwardly. The top cover member can then be easily fastened to the edges of the side boxes, the U-bars 56 raised and the covering device will be taut and weather tight.

A furniture arrangement is provided for the trailer in a manner which permits the trailer to be compactly folded and also to provide a table and bench arrangement as well as a bed. The first embodiment of this furniture arrangement is shown in FIGURES 2, 3, 5 and 6. In FIGURE 2, the furniture structure is shown in a bed position. A stationary U-shaped bracket 70, one at each end anchored to the floor 20, supports one side of a bed panel 72 through a secondary L-shaped bracket 74 attached to the bed panel and pivoted to the bracket at 76. The bed panel has a mattress cushion 78. The other end of the bed panel is supported on a projection 80 on a portion of a double end U-shaped bench bracket 82, these bench brackets 82 supporting a bench seat panel 84 and being anchored to the floor through a pair of links 86 pivoted at 88 to a floor bracket. The back panel 90 of the bench lies horizontally in alignment with the seat panel 84, as shown in FIGURE 2, and is supported by a U-shaped bracket 92 pivotally mounted by small brackets 94 (FIGURE 6) on the underside of the bench back. These bench panels are also suitably covered with cushions 96 and 98 so that when arranged as in FIGURE 2, a complete bed is formed.

FIGURE 3 shows the parts in compacted position for the folding in of the fore and aft end boxes. This has been accomplished by simply turning the bench back panel 90 on pivot point 100 where it is supported so that it lies over the cushion 96 and the bench seat panel 84.

To obtain a table and bench arrangement from this construction, reference is made to FIGURES 5 and 6. It will be seen that the bed-table panel 72 has been pivoted 180° so that the panel 72 is now on top and the U-shaped brackets 74 are upright. At this time, a second table support in the form of a U-shaped bracket or strut 102, with an angled leg portion 104, comes into place to support the other edge of the table through a pivot joint 106 at each end of the table, the leg portions 104 resting on the floor 20. This positions the table near the bench 36 at the end box 30 so that persons sitting on the bench 36 can readily reach the table.

The other side of the table is serviced by the folding bench which is actually translated longitudinally of the floor panel around the pivot 88, the panel 84 being lifted up and moved toward the table so that it will be seen that the link 86 is now facing in the opposite direction from the pivot 88. Compare FIGURE 5 with FIGURE 2. As this movement takes place, a pair of small triangular plates 108 pivoted at 100 are shifted by a connecting link 110 anchored at one end on links 86 to the position shown in FIGURES 5 and 6 to furnish a support at each end for the back panel 90 which has mounting brackets 112 which seat at a rear corner against a rigid tab 114 on plate 108. The plate 108 is mounted on the pivot 100 over a stationary plate 116 which is anchored to the seat-bench panel 84 at the rear edge thereof. This construction is best shown in FIGURE 6. Thus, the furniture construction has the three positions, table and bench position, sleeping position, and compacted storage position.

In FIGURES 8 to 11, a modified furniture arrangement is shown in the same outer housing construction. In this arrangement, it is possible to have a stove or refrigerator cabinet 120 which can be pivoted from a position parallel to the sides of the trailer as shown in FIGURE 8 to a position crosswise of the trailer as shown in FIGURE 11 for storage position. This structure can be pivoted on a corner pivot element 122 which, in the case of an ice refrigerator, can serve as a drain pipe.

The present modification differs from the previous furniture arrangement in that in the storage position, the bench is entirely under the stored bed panels. In FIGURES 8 and 9, the table and bench position is shown wherein a table panel 124 is supported at one edge by the small U-shaped brackets 126 pivoted at 128 on the upright stanchion brackets 130 anchored to the floor. The panel 124 has a mattress cushion 132 on its undersurface as shown in FIGURE 8. The other edge of the table is supported by an L-shaped U-bracket or strut having a leg 134 at each end underlying the table and a leg 136 extending to the floor terminating in a slight curved portion 138 which has a cross bar 140 which extends across the trailer to the opposite legs. In this position, the table is in suitable relationship to the bench 36. The bench construction in this case has a seat panel 142 with a cushion 144 supported on a U-shaped bracket 146 at each end. A triangular plate 148 on the back corners of the panel 142 serves as a mount for a plate 150 and a plate 152 all pivoted at 154. The back panel 156 of the bench has a suitable cushion 158 and a U-shaped leg member 160 on the back side which comes into function in the bed position.

When the utility case 120 is extending lengthwise of the trailer as shown in FIGURES 8, 9 and 10, the furniture structure can be formed into a bed as shown in FIGURE 10. To accomplish this, the entire bench is lifted and moved back around the pivot point 162 on a pair of links 164 which are anchored at 166 to the seat panel 142. In going through this movement, the pivoted plates 150 are shifted by an actuating link 168 to the position shown in FIGURE 10 so that the back panel 156 of the bench can move to the horizontal position and be supported by the U-shaped bracket 160. At the same time, the bed panel 124 is pivoted 180° and the supporting bracket 136 is also swung around on the pivot 170 so that the leg 134 now contacts the floor and the leg 136 stabilizes along side of the table with the exception that the cross bar 140 underlies the panel 124 to serve as a stop for the bracket. Thus, the legs 134 and 136 change function in the two positions. The bed is thus supported independently of the bench.

For movement to the compacted storage position, the bed panel 124 is lifted and the entire bench construction, which has been folded together by positioning cushion 158 against cushion 144, is swung around the pivot 162 to a position below the bed panel 124. The seat assembly, of course, must pivot also around the point 166 to reach the position shown in FIGURE 11. In this compacted position then, the storage compartment 120, whether it is a stove or a refrigerator, can be pivoted into a storage position so that the two enclosing ends 28 and 30 may collapse on either side of the compacted furniture structure to permit closing and sealing of the trailer.

It will thus be seen that the furniture items are movable on the floor, that is, translatable from one side of the trailer to the center making it more convenient to provide walking space in the trailer and still permitting central location for storage. The interlocking linkage controls the bench backs depending on the position of the benches.

In the closing action of the trailer from the position shown in FIGURE 4, the U-bars 56 will fold down to lie adjacent the end walls 34, and the ridge pole U-bar swings down toward the floor with sufficient width between the legs 48 to straddle the furniture assembly shown in FIGURE 3.

In FIGURE 12, a modified frame structure is shown having a floor panel 180 with fore and aft hinged boxes 182 and 184, each box having side panels 186 and 188 on opposite sides of the trailer and being hinged at the joint 190 to permit swinging to the closed position shown in FIGURE 14. Each box also has a cross panel 192 which serves as an end of the living quarters when the trailer is opened for use and which serves as a cover when the trailer is folded.

In FIGURE 13, it will be seen that there is an extruded molding strip 194 fitted to the edges of the panels 186, 188 and 192. This mounting carries an extruded rubber or plastic sealing strip 196 which serves to seal the joints when the trailer is collapsed. A small re-entrant groove 198 on the outside of the strip 194 can serve as a fastening recess for the flexible covering of the unit. A U-shaped ridge bar having a supporting cross member 200 and legs 202 is mounted on bracket members 204 anchored solidly to the floor and spaced inwardly slightly from the edge of the floor panel on each side. End supporting U-bars 206 are pivoted on the short arms 208 at a pivot bolt 210 mounted on a small reinforcing plate 212 at an upper corner of the end box nearest the interior when in open position. Tension springs 214 are utilized to urge the U-bars to a collapsed position as shown in FIGURE 14.

Accordingly, when the U-bars 206 are lifted to the position shown in FIGURES 12 and 13, the tension of the spring is increased to urge the bars outwardly toward the ends of the structure. The spring 214 is anchored in a small bracket 216 on the arms 208 and on a pivot bolt 218 anchored into the side run of the molding 194. Also pivoted on this bolt in the upper, inner corner of the end boxes as extended is a triangular gusset plate on bracket 220 which is solidly connected to the end of a rectangular metal frame 222 intended to serve as a bunk bed. This frame has a flexible covering 224 which is stretched tight on the frame to serve as a bed support. When the bed is lifted to a horizontal position as shown in FIGURE 12, a small projection stud 226 serves as a resting point for the forward free edge portion of the bunk. When the bunk is in a position shown in FIGURE 13, it can serve as a back rest for the bench seats 228 located in the end boxes 182 and 184.

Extending longitudinally of the structure are two parallel straps 230 each of which is anchored to the cross member 206 of the end U-bars and to the ridge bar 200. Thus, the springs 214 tend to hold the straps taut when the device is opened up as shown in FIGURE 12. Fastened to the straps 230 at 232 near the outer ends thereof are small flexible lengths of straps 234 which can be fastened to the flexible covering on the unit to pull it outwardly and stretch it over the framework as the device is opened. This places the edges of the roof covering near the joints where they can be manually fastened over the edges of the end boxes.

The mounting arms 208 of the end U-bars 206 are spaced more widely than the vertical legs 202 of the ridge pole unit and the brackets 204 so that they will straddle outside the legs 202 in the collapsed position as shown in FIGURE 14. Accordingly, when the device is opened up from the position shown in FIGURE 14, the outward motion of the end boxes 182 and 184 will put tension on the straps 230 to lift the ridge bar 200 to the central position shown in FIGURE 12 and this will also put tension on the strap sections leading to the bars 206 to lift them to the upright position of FIGURE 12 to provide a support for a flexible cover similar to that shown in FIGURES 1 and 2.

The bunks 224 can be optionally left in the vertical position during the day and then raised at night so that the unit can easily sleep four people and utilizing the bed structure shown in FIGURE 2, the unit can be used to sleep six people.

I claim:

1. In an expandable and contractile living quarters of the type having a floor and end boxes which cover and enclose the space above the floor in closed position and form floor extensions and end walls in open position with a collapsible cover for enclosing a housing space, that improvement which comprises:
  (a) an inverted ridge pole support in the form of a U-shaped bar, the bight section thereof forming a horizontal ridge pole when in upright hoisted position,
  (b) pivot means supporting the downwardly extending ends of the legs of said U-shaped bar adjacent the floor to permit the bar to be lowered and hoisted, said U-shaped bar pivoting toward one of said end boxes upon lowering,
  (c) flexible means connecting said end boxes and said bar wherein opening movement of said end boxes permits hoisting of said bar to an upright position to provide support for a collapsible cover.

2. A device as defined in claim 1 in which the flexible means is positioned across said floor and near the top of the intended housing space to furnish support to a collapsible cover supplemental to the support of said ridge pole.

3. A device as defined in claim 1 in which the flexible means is anchored to the edges of the end boxes and to the ridge pole, thus spanning the intended housing space to furnish support to a collapsible cover supplemental to the support of said ridge pole, and additional U-bars pivoted on said end boxes each having a bight cross bar to move parallel to the bight of said hoisted ridge pole between said pole and said end boxes to raise and support the collapsible cover and said flexible means to provide head room in said intended living space.

4. A device as defined in claim 1 in which the flexible means is anchored to the edges of the end boxes and to the ridge pole, thus spanning the intended housing space to furnish support to a collapsible cover supplemental to the support of said ridge pole, additional U-bars pivoted at the ends thereof on said end boxes at the upper corner nearest the interior of the trailer when in opened position, each having a bight cross bar to move parallel to the bight of said hoisted ridge pole between said pole and said end boxes to raise and support the collapsible cover and said flexible means to provide head room in said intended living space, said flexible means being fastened to said additional U-bars whereby to move them into position upon the opening of said boxes, and resilient means urging said additional U-bars to a folded position within the respective end boxes and serving to maintain tautness of said flexible means.

5. A device as defined in claim 4 in which a frame for an upper bed is pivoted in said end boxes adjacent the upper, inner corner when extended, said frame being movable to lie in a horizontal plane when said boxes are extended, and means on said boxes to support the free edge of said frame to maintain said horizontal position, said upper bed being movable to position adjacent a wall of said end box to serve as a seat back.

6. A device as defined in claim 4 in which the legs of the additional U-bars are spaced more widely than the legs of the ridge pole U-bar to straddle the latter said legs when the end boxes are moved to a closed position over said floor.

7. In a compact expandable and contractile living quarters of the type having a floor and end boxes which cover and enclose the space above the floor in closed position and form floor extensions and end walls in open position with a collapsible cover for enclosing a housing space, that improvement which comprises:
  (a) a table panel anchored to the floor and translatable by a pivot means from a table level position near one end box to a lower level position away from said one end box and generally central between said end boxes, and
  (b) a first bench assembly anchored to the floor translatable from a position adjacent said table in table level position to a position adjacent and substantially level with said table in a lower level position,
whereby said end boxes may close on opposite sides of said table and bench assembly in translated position.

8. A device as defined in claim 7 in which a second bench assembly extending along one of said end boxes is positioned in table-chair relation to said table in table-level position and is movable into the space vacated by said table when said table is translated to the lower level position and said one of said end boxes is closed.

9. A device as defined in claim 7 in which said first bench assembly has a back member movable from an upright position to a lower level position to form an extension of said table and first bench assembly in lower level position and thus form a bed.

10. A device as defined in claim 9 in which said back member is shiftable to a collapsed storage position atop said first bench assembly to permit closing of said other end wall, and means to block said movement of said back member to the lower-level position operable when said first bench assembly is adjacent said table at table level position.

11. A device as defined in claim 10 in which said means comprises a plate pivoted at the juncture of said first bench assembly and back, a link connected to said plate to shift said plate in response to the translation motion of said first bench assembly, and means on said plate to contact said back to hold it in upright position.

12. A device as defined in claim 1 in which means is provided to mount and anchor said first bench assembly to facilitate movement of said first bench assembly to a storage position below said table in lower level position to free space on said floor centrally thereof.

13. A device as defined in claim 7 in which a utility cabinet for a stove or refrigerator is mounted on said floor for movement into the space normally occupied by said first bench assembly when not in storage position.

14. A device as defined in claim 7 in which means to mount and support said table comprises:
   (a) bracket means forming a pivot mount near and below one edge of said table whereby swing of said table 180° on said mount moves it toward the center of said floor and down to a level below said pivot, and
   (b) a pair of L-shaped legs pivoted adjacent the other edge of the table having a first leg portion to underlie and stabilize against the bottom of the table and a second leg portion to extend to the floor, said legs reversing their function when said table is shifted to lower-level position.

15. A device as defined in claim 14 in which said legs of said pair of L-shaped legs are joined lengthwise of the table to add a stabilizing effect to said assembly.

References Cited

UNITED STATES PATENTS

| | | | |
|---|---|---|---|
| 1,241,342 | 9/1917 | Chapman | 296—23.6 |
| 1,595,541 | 8/1926 | Borah | 296—23.6 |
| 1,648,965 | 11/1927 | Simons | 296—23.2 |
| 2,481,230 | 9/1949 | MacDonald | 296—23.1 |
| 2,502,024 | 3/1950 | Poche | 296—23.1 |
| 3,062,579 | 11/1962 | Smith | 296—23 |

FOREIGN PATENTS 98,624     1961    Netherlands.

JOHN E. MURTAGH, *Primary Examiner.*